United States Patent

[11] 3,556,235

| [72] | Inventors | Kenneth C. Allen;<br>Edwin E. Boshinski, Dayton, Ohio |
|---|---|---|
| [21] | Appl. No. | 857,761 |
| [22] | Filed | Sept. 15, 1969 |
| [45] | Patented | Jan. 19, 1971 |
| [73] | Assignee | The Hobart Manufacturing Company<br>Troy, Ohio<br>a corporation of Ohio |

[54] PHOTOCELL CHECKING CIRCUIT FOR OPTICAL WEIGHING SCALE
15 Claims, 9 Drawing Figs.

[52] U.S. Cl............................................. 177/177,
177/210; 324/21, 177/177
[51] Int. Cl........................................................ G01g 23/30
[50] Field of Search........................................... 177/50,
177, 25, 210, P.E.Digest; 250/231 (Inquired);
324/20, 21, 96 (Inquired); 73/(Inquired)

[56] References Cited
UNITED STATES PATENTS

| 2,797,614 | 7/1957 | Heidenhain | 177/P.E. Digest |
| 3,038,080 | 6/1962 | Matarase | 324/96X |
| 3,042,128 | 7/1962 | Bell et al. | 177/210 |
| 3,044,691 | 7/1962 | Allen | 177/25X |
| 3,335,367 | 8/1967 | Skooglund et al. | 324/96 |
| 3,447,617 | 6/1969 | Susor et al. | 177/50X |

FOREIGN PATENTS

| 173,332 | 11/1960 | Sweden | 177/P.E. Digest |

Primary Examiner—Richard B. Wilkinson
Assistant Examiner—George H. Miller, Jr.
Attorney—Marechal, Biebel, French & Bugg ABSTRACT: In a computing weighing scale including photoelectric transducers for converting the weight of a commodity into electrical signals, computing means responsive to the output from the photoelectric transducers, and means for indicating the output from the computing means, a testing circuit is included for determining if all of the photoelectric transducers respond properly to illumination. The testing circuit includes means for illuminating all of the transducers in accordance with a predetermined pattern, preferably simultaneously, circuit means for checking each transducer individually for an electrical output indicating that the transducer responds properly to illumination, and means for indicating if any transducer fails to respond properly to illumination. In one embodiment, the transducers are provided with light from the same source as used in the weighing operation while in another embodiment a separate lamp is provided located near the transducers. Photocell checking may be initiated at several different times, such as once during each scale operation, periodically as determined by a counter, whenever the scale reads below a predetermined weight, when the scale is first turned on, or when any change is made in the means for printing the name of the commodity being weighed.

PATENTED JAN 19 1971

INVENTORS
KENNETH C. ALLEN &
EDWIN E. BOSHINSKI

BY Marechal, Biebel, French & Bugg

ATTORNEYS

PHOTOCELL CHECKING CIRCUIT FOR OPTICAL WEIGHING SCALE

RELATED APPLICATION

This invention relates to an improvement on the invention described in U.S. application Ser. No. 422,730, filed Dec. 31, 1964, for WEIGHING SCALES, and is assigned to the same assignee.

BACKGROUND OF THE INVENTION

In weighing scales of the type described in the above mentioned application, a scale platform is mechanically connected to an optical chart which moves through a distance proportional to the weight of the commodity placed on the platform. A plurality of photoelectric transducers sense the position of the optical chart and generate electrical signals which are stored in registers. The information in the registers is then used in the recording of the weight and the computation of value of the article being weighed. The photoelectric transducers therefore permit the scale platform to move independently of the weight reading devices.

Accuracy of the measurements can be assured only if all of the photoelectric transducers function properly during the weighing operation. These transducers are normally checked for their light responsive characteristics during the routine maintenance of the scale, however, scales of the type described above do not provide for checking these transducers during regular use.

SUMMARY OF THE INVENTION

This invention relates to an improved weighing scale including a photoelectric transducer testing circuit wherein all photoelectric cells are illuminated in accordance with a predetermined pattern, preferably simultaneously and checked for proper response. In one embodiment, the optical chart has one portion wherein light may be transmitted to all of the photocells simultaneously. The checking operation in this embodiment is preferably initiated when the scale is initially turned on and each time the operator changes the commodity printing key on the scale printer. The same light source and optical path as employed in the weighing operation are used in this embodiment for photocell checking.

Another embodiment of the invention employs a separate transducer checking lamp which is located near the photoelectric transducers and which is energized only during the checking operation. The checking operation can be initiated at several different times including but not limited to the initial turn on of the scale, when a change is made in the commodity printing key, when the scale reads below a predetermined weight, once during or after each operating cycle, or periodically, as determined by a counter.

It is therefore an object of this invention to provide an improved weighing scale of the type described which includes a plurality of photoelectric transducers sensing the light projecting through an optical chart to indicate the weight of an object, the improvement including means for checking the photoelectric transducers for proper operation by illuminating all of the transducers in accordance with a predetermined sequence and then sensing their outputs to determine proper operation; and to provide an improved weighing scale of the type described wherein operation of the weighing scale is suspended in the event that one of the photoelectric transducers fails to respond properly to light.

BRIEF DESCRIPTION OF THE DRAWINGS

FIG. 3 is a schematic electrical diagram of one embodiment of a photoelectric transducer checking circuit where the transducer checking sequence is initiated by a change in the commodity printing key or when the scale is initially turned on;

DESCRIPTION OF THE PREFERRED EMBODIMENTS

Figure 1:
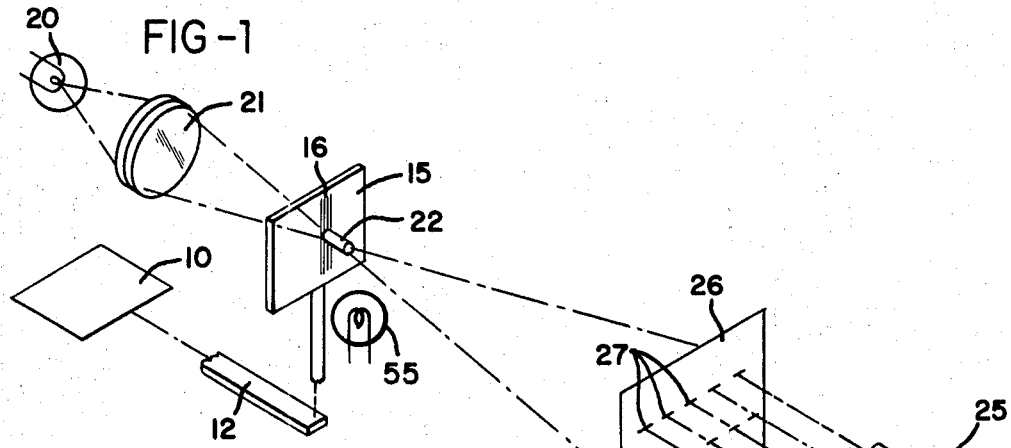
FIG. 1 is a diagrammatic view of a weighing scale showing the relationship between the scale platform, the optical chart, a light source, the photoelectric transducers, and the electronics which convert the scale output into readable form.

Referring to the drawings, which illustrate preferred embodiments of this invention, FIG. 1 shows photoelectric means for reading out the weight of a commodity placed upon the platform 10. A lever 12 connects the platform with an optical chart 15 which is supported for movement in accordance with the balanced position of the platform 10. Weight information, i.e., a range of weights, is encoded on the chart 15 into closely spaced rows 16 of binary marks. The chart 15 forms a part of an optical projection system which is shown diagrammatically as including a fixed projecting lamp 20, a lens 21 to concentrate the light of the lamp element on the chart 15, and a lens 22 to project an enlarged image of a small vertical extent of the chart rows 16 onto photoelectric transducers 25 through a cooperating mask 26. Each photocell 25 is positioned immediately behind a corresponding slit 27 in the mask 26.

In the embodiment of the invention shown in this and the above mentioned application, 14 photoelectric transducers or photocells are employed. In order to conserve space within the optical system, and to position the photocells 25 as closely to the center of the optical axis as practical, five photocells are placed in each of two rows and four in a third row, with each of the photocells 25 being spaced both laterally and vertically from the adjacent photocells and from the photocells in the adjacent rows.

The output from the photocells is converted into an appropriate form by computer circuit 30 where the weight information may be multiplied by the price per unit weight. A register circuit 35 indicates the output of the computer circuit 30 by producing a printed form containing the weight, unit price, and the total price of the commodity on the platform. Alternatively, the circuit 35 could merely visually display these FIGS.

A test circuit 40 senses the status of selected flip-flops within the computer circuit and provides an indication of the proper operation of the photoelectric transducers 25 at selected times during the operation of the scale.

Figure 2:
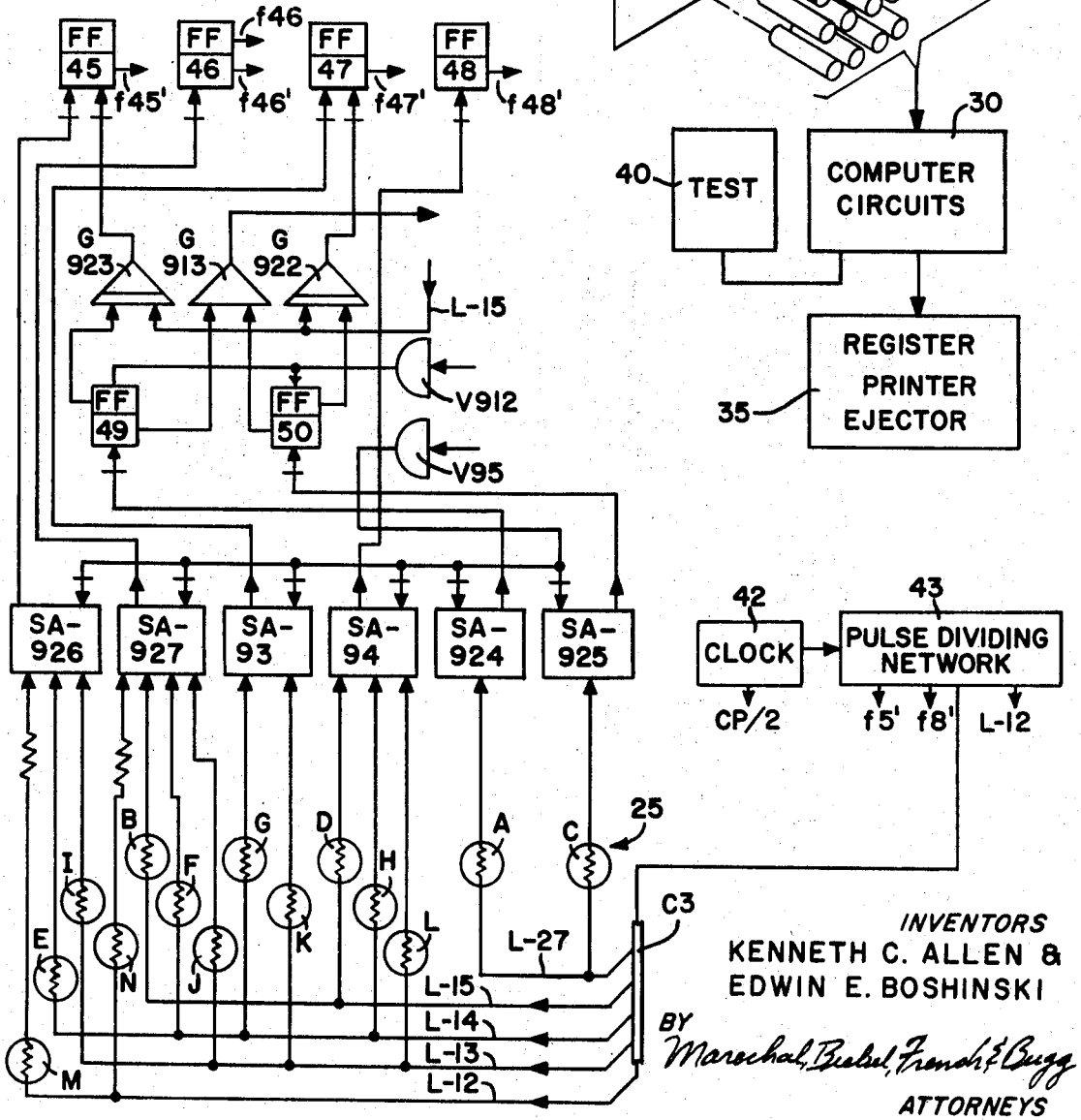
FIG. 2 is an electrical schematic diagram of a portion of a weighing scale showing the photoelectric transducers and the registers which store the weight information sensed by the transducers.

Referring now to FIG. 2, fourteen photoelectric transducers are included in the readout circuit, as described in the above-mentioned copending patent application. These photoelectric transducers are preferably photoresistors of the type designated CL604, manufactured by Clairex Corporation, and are designated by reference numerals 25A through 25M. FIG. 2 is a partial electrical schematic diagram showing that part of the circuit which may be found in FIGS. 6 and 11 of the above mentioned copending application.

Photocells 25A and 25C are energized by a voltage on line L-27 in cable C3 to sense motion of the optical chart, and when the chart is at rest, gate G913 will provide an output to begin the weighing and computing cycle.

At this time, photocells 25M and 25N will then be energized by an enabling voltage on line L-12, and their outputs will be applied to sense amplifiers SA926 and SA927, respectively, and the outputs from these amplifiers will set flip-flops FF45 and FF46, respectively, according to whether light falls on either of these photocells through the optical chart 15.

Similarly, the remaining photocells will be selectively energized by enabling voltages from lines L-13 through L-15, and their outputs, through their respective sense amplifiers, will be applied to control the status of flip-flops FF45 through FF48. Thus, only four photocells are energized at any one time, and their outputs applied to control the status of four flip-flops, according to whether or not light falls on these photocells.

For each set of photocells energized through appropriate voltages on lines L-12 through L-15 and L-27, the flip-flops FF45 through FF48 will be interrogated and the information which they contain will be transferred into the computer circuit.

The flip-flops FF45 through FF48 therefore provide the signals necessary to convert the weight sensed by the optical chart into decimal form and to provide the signals which are used in determining the total price of the commodity being weighed.

Since the photocells are energized in accordance with a predetermined pattern, it follows that it is only necessary to illuminate those photocells which are energized in order to test them for proper operation. For convenience, and for simplicity of operation, all of the photocells are illuminated simultaneously in the embodiments of the invention shown herein. It is, nevertheless, within the ability of those skilled in the art to provide a mechanism which will illuminate the photocells at the same time they are energized. If this were done, four separate light sources would be employed, each source illuminating one set of photocells in accordance with the predetermined pattern. Any departure from this pattern in the photocell output would be indicative of a photocell failure.

Figures 6, 7:
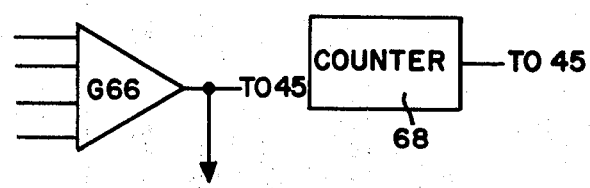
FIG. 6 is a partial electrical circuit of a modification of the checking circuit of FIG. 5 showing another input for initiating photoelectric transducer checking when the computing cycle is completed.
FIG. 7 is a partial electrical circuit of a modification of the checking circuit shown in FIG. 5, showing another input for initiating photoelectric transducer checking after a predetermined number of weighing cycles.
Figure 8:
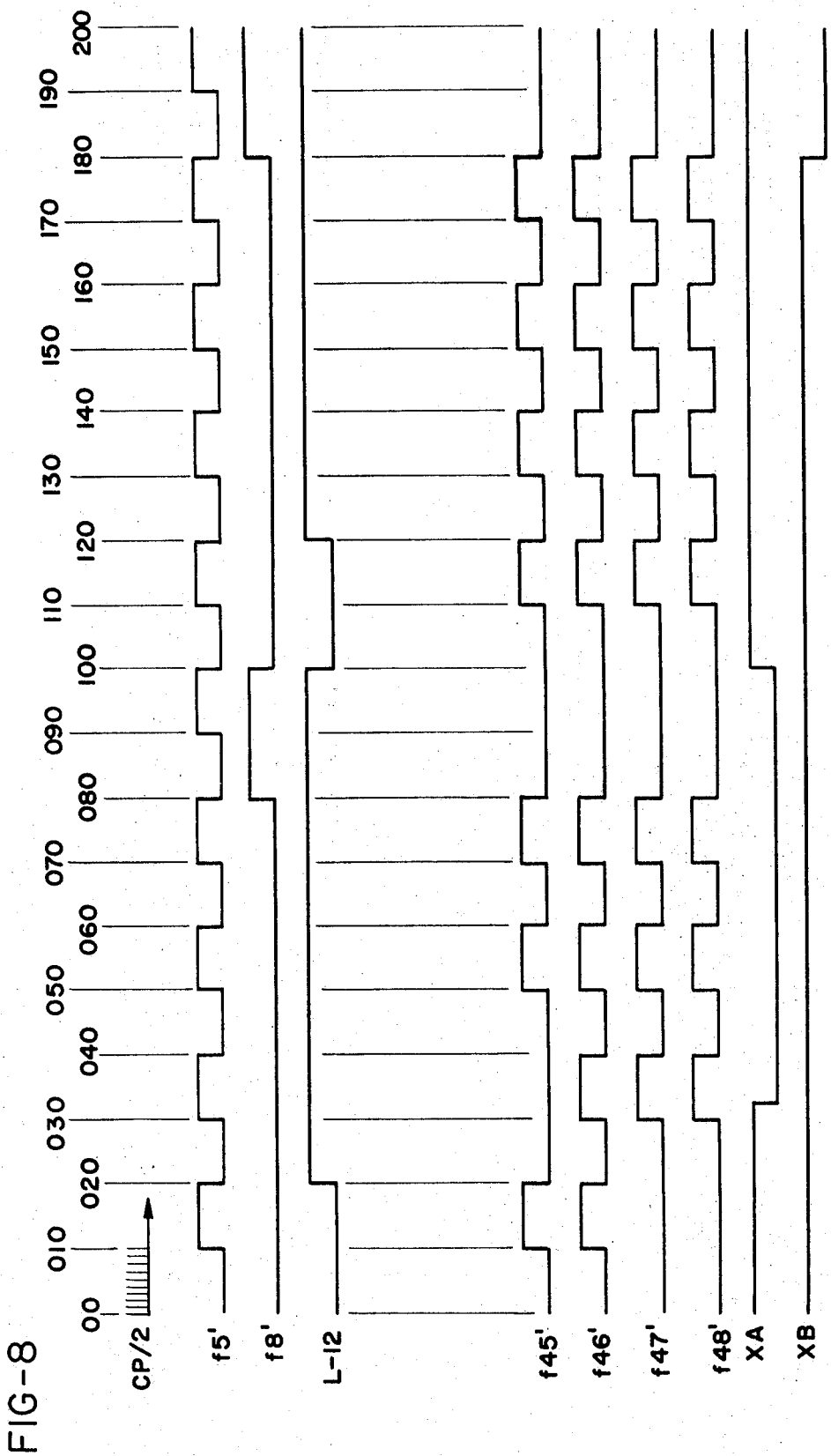
FIG. 8 is a timing chart showing the status of some of the components in FIG. 3, the first half of the chart showing improper responses from the photoelectric transducers and the second half showing proper responses.

A clock 42 provides 10 microsecond pulses each 100 microseconds, and these pulses are applied to a pulse dividing network 43, which is shown in FIGS. 6, 7 and 8, in the above-mentioned copending application as including FF1 through FF12. The clock also provides a clock pulse output identified as CP/2 which supplies pulses each delayed 50 microseconds from the main clock pulses.

The outputs from the pulse dividing network 43 are used in this invention to control the sequence of the photoelectric transducer testing operation. The outputs from this pulse dividing network are also used to control the energization of the photocells, as well as the computing cycles, as explained in the above-mentioned application.

In the first embodiment described herein, all photocells 25 are simultaneously illuminated with light from the lamp 20 through the chart 15 which is provided with a transparent portion at a predetermined location, preferably when no weight is on the scale platform. Thus, in this embodiment, not only are the photocells 25 checked for proper operation, but the lamp 20, chart 15, lenses 21 and 22, mask 26, and other components of the optical system, are also checked. The photocell testing sequence is initiated upon the first application of power to the unit, as will be explained, as well as when the operator changes the commodity printing key, as is usually done in preparation for the weighing of a new commodity.

In the scale described in the above-mentioned application, to change the commodity printing key, the change commodity switch 65 is closed and this will cause the tare light 24 to light. This light is extinguished by the operator merely touching the tare adjustment knob 23, and this touching is sensed by the tare guard circuit 46 to reset FF67. In this improved embodiment, however, the tare light 24 will remain on until the photocells have been checked and all have responded properly to light and the knob 23 has been touched. In the above-mentioned copending application, whenever an attempt is made to initiate a system cycle while the tare light 24 is lit, the result will be an error light indication and no printer operation.

Figure 3:
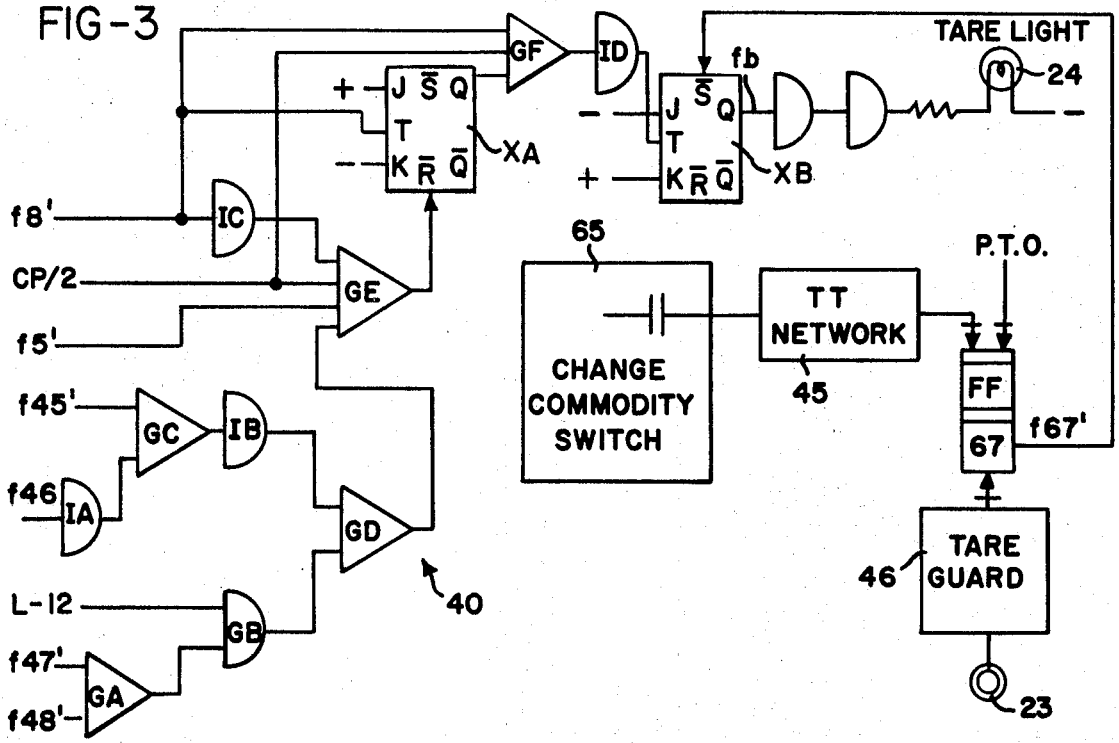

Referring now to the schematic diagram of FIG. 3 and the timing chart shown in FIG. 8, the operation of the change commodity switch 65 will cause a pulse to be applied to the trailing trigger network 45 which, in turn, applies a pulse to set flip-flop FF67. (This flip-flop and the change commodity switch are also shown in the above-mentioned copending application at the lower left in FIG. 13).

Flip-flops XA and XB are a J-K flip-flops where a negative going signal on the trigger input will place the Q and $\bar{Q}$ outputs at the same polarity as the polarity indicated on the J and K inputs, respectively. In these drawings, $fa$ is the Q output of flip-flop XA and $fb$ is the Q output of flip-flop XB. A negative voltage level on the $\bar{R}$ (reset) terminal of flip-flop XA will result in a negative voltage level on the output $fa$. Also, a negative voltage level on the $\bar{S}$ (set) input of flip-flop XB will cause a positive voltage level to appear on output $fb$. Flip-flop XA is triggered to the set condition each time $f8'$ is negative going, and this occurs at times 00, 100, 200, etc. as illustrated on the timing chart of FIG. 8.

An output on line $f67'$ from flip-flop FF67 is applied to set flip-flop XB. Accordingly, a positive output on line $fb$ will be applied to the tare light 24 through amplifying circuits, and this light will be energized to indicate the tare setting must be checked. Thus, as long as flip-flop XB is in the set condition, the tare light will be energized.

Flip-flop XB is controlled by three inputs, one from flip-flop F8 in the pulse dividing network 43 which indicates that all of the photocells have been selectively energized in sequence, a clock pulse on line CP/2 and an output from flip-flop XA. If all of the photocells are functioning properly, flip-flop XA will remain in the set condition and will thus supply the proper output to reset flip-flop XB at the conclusion of the testing cycle.

Gate GA is connected to terminals $f47'$ and $f48'$ of flip-flops FF47 and FF48. These flip-flops store the outputs from photocells 25C, D, G, H, K and L, in sequence, as determined by the pulse dividing network 43. If both inputs to gate GA are positive, its output will be negative and this will be applied to OR gate GB which will apply a positive pulse to one input of gate GD. Gate GC receives its input from flip-flops FF45 and FF46 to indicate the condition of the remaining photocells, and if these cells are functioning properly, a negative output will be applied to inverter GB which will also apply a positive input to the other terminal of gate GD.

In the checking sequence, photocells 25M and 25N are first checked alone. This occurs during the time 010 to 020 as shown in the timing chart in FIG. 8. Thus, only the status of flip-flops FF45 and FF46 will be interrogated and flip-flops FF47 and FF48 will remain in the reset condition. To prevent a false indication of photocell failure due to the reset state of these flip-flops, an inhibit signal is applied on line L-12 to OR gate GB. As readily seen in the timing chart of FIG. 8, this inhibit signal is only applied from time 00 through 20.

Gate GE will have applied thereto positive pulses to each of the first three terminals during the checking of each set of photocells. The fourth terminal of gate GE receives its input from gate GD, and as long as all photocells are functioning properly, the output from this gate will remain negative thus preventing an output from gate GE to reset the flip-flop XA. If at anytime during the photocell checking sequence, one of the photocells fails to generate a sufficient output to trigger and set its corresponding flip-flop FF45 through FF48, a positive output will be generated from gate GD thus causing flip-flop XA to reset.

At the end of the photocell checking sequence, if flip-flop XA is in the reset condition, an inhibit will be applied to gate GF and thus flip-flop XB will remain in the set condition and a continuing indication of photocell failure will be provided by the continued energization of the tare light 24. As previously mentioned, XA is triggered to the set condition prior to each photocell checking sequence by a negative going signal on line *f8'*.

On the other hand, if flip-flop XA is not reset at any time during the photocell checking sequence, flip-flop XB will be triggered to the reset condition at the end of the sequence, due to a pulse through gate GF and inverter ID, and will remove the indication of photocell failure which, in the embodiment shown in FIG. 3, is the illumination of the tare light 24.

The photocell checking sequence is also initiated upon the first application of power to the weighing scale. At this time, a signal on the P.T.O. (power turn on) line is applied to flip-flop FF67. This has the same effect as closing the change commodity switch 65 in that it sets flip-flop FF67, and an output on line *f67'* sets flip-flop XB. Thus, the photocell checking cycle is performed each time the scale is initially turned on for use, and thereafter each time the change commodity switch 65 closes.

In FIG. 8, two complete photoelectric transducer checking sequences are illustrated, the first between time 00 and 100, and the second between time 100 and 200. In the first sequence, flip-flop FF45 fails to set, as indicated by a lack of an output on line *f45'* between time 030 and 040. This may be caused by a failure of photocell 25I to respond properly to light. Accordingly, flip-flop XA will set upon the occurrence of the CP/2 pulse, which is delayed in order to allow the voltages on the testing circuit components to settle, and therefore no reset signal will be provided for flip-flop XB at time 080, or when a signal appears on line *f8'*. In the second sequence, all photocells check out properly, and therefore flip-flop XB will reset at time 180, corresponding to the occurrence of the *f8'* pulse.

Figure 9:
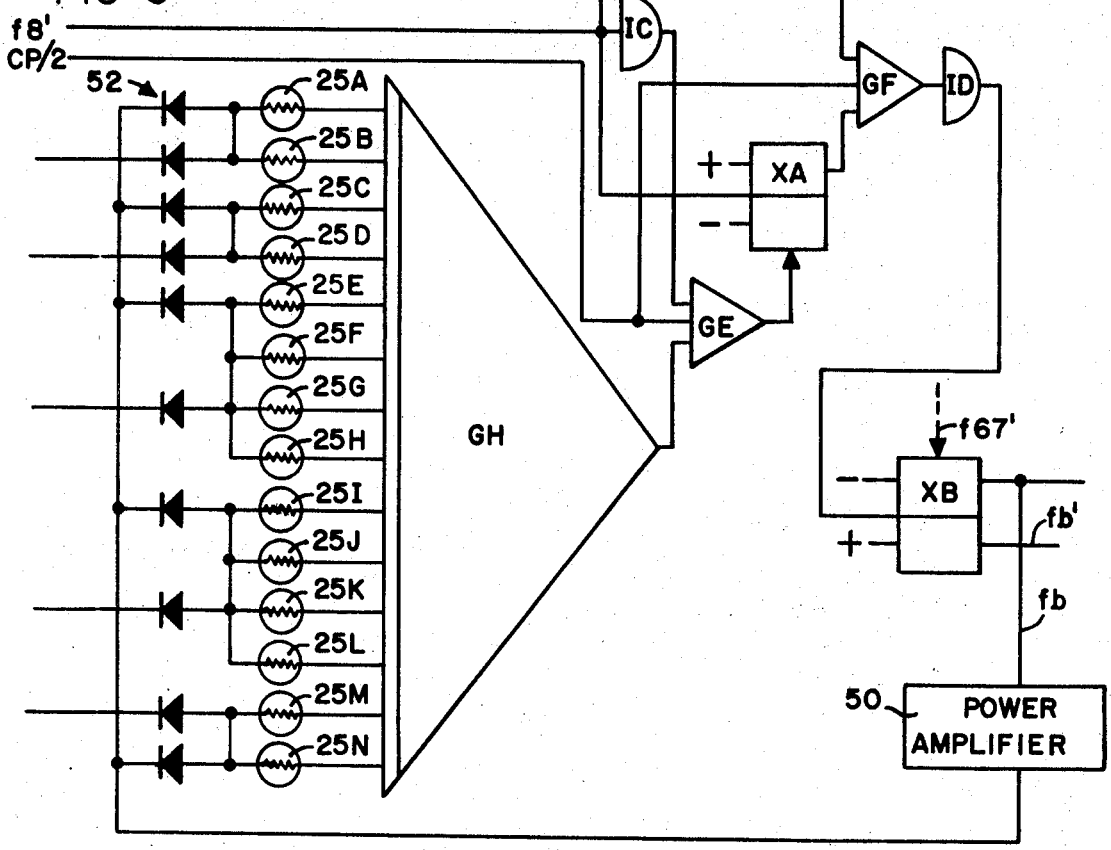
FIG. 9, on the same sheet of drawings with FIGS. 5—7, is an electrical schematic diagram of another embodiment of the photoelectric transducer checking system where all transducers are checked simultaneously.

Another embodiment which may be used to check all photocells simultaneously is shown in FIG. 9. Here, like components are designated by like reference numerals. Thus, when flip-flop XB is set at the beginning of the testing sequence, it will generate an output to a power amplifier 50 which will energize all of the photocells 25 simultaneously through isolating diodes 52. These diodes are included in the circuit to permit normal operation of the photocells during the weighing and computing cycle of the scale while allowing a check to be made of all of the photocells simultaneously when desired. Each photocell is connected to a gate GH, and if all are functioning properly, an inhibit will be applied to gate GE to prevent flip-flop XA from setting and thus indicating a photocell failure.

Several modifications of the two basic circuits shown in FIGS. 3 and 9 may be employed according to the type and frequency of photocell checking desired.

Figure 4:
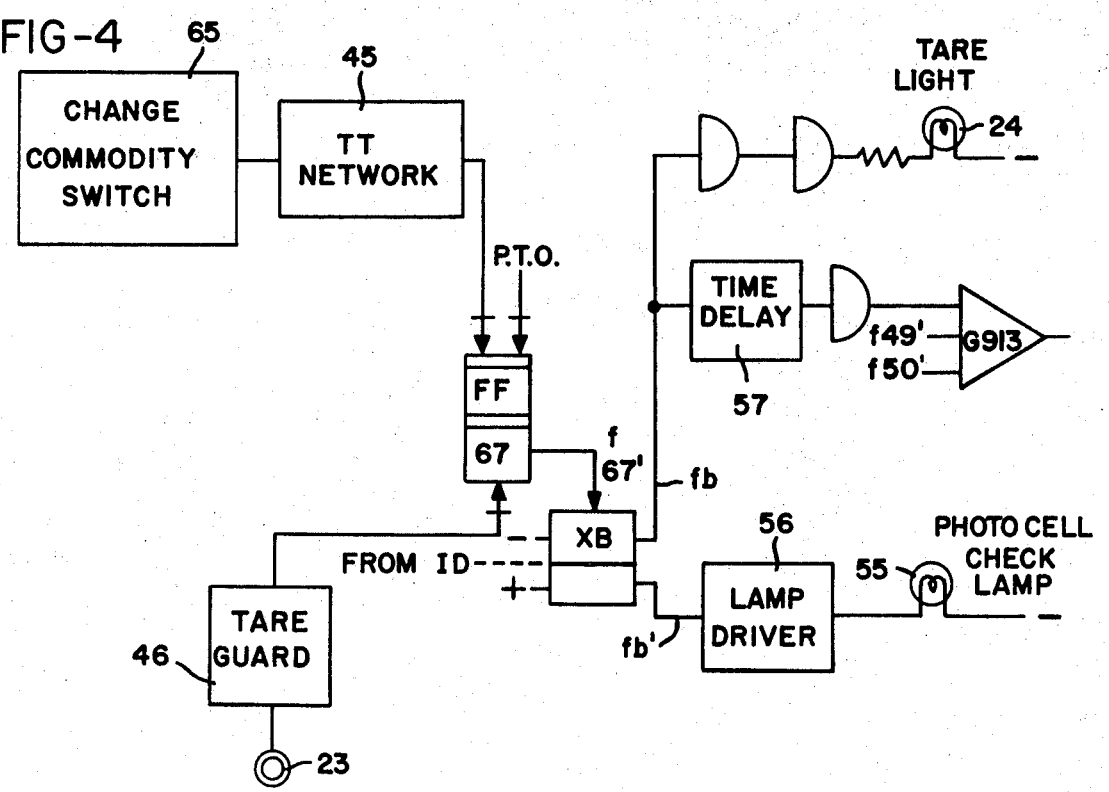
FIG. 4 is an electrical schematic diagram showing one modification of the checking circuit shown in FIG. 3 employing a separate transducer checking lamp.

In FIG. 4, an electrical schematic diagram shows a modification where a separate cell checking lamp is employed to illuminate each of the photocells simultaneously without requiring that the optical chart be in a position whereby energy from the lamp 20, shown in FIG. 1, impinges on each cell at the same time. This embodiment thus permits the cells to be checked independently of the position of the optical chart whenever a change is made in the commodity key as indicated by the momentary closure of the change commodity switch 65.

In FIG. 4, the input from the photocell checking circuits, shown in detail in FIGS. 3, or 9, are not shown for sake of clarity and simplicity. Once flip-flops XB is placed in the set state, the tare lamp 24 will light to indicate to the operator that he must touch the tare adjustment knob 23 and thus reset flip-flop FF67. At the same time flip-flop XB is set, the photocell checking lamp 55 will be energized through lamp driver circuit 56. This lamp, as shown in FIG. 1, illuminates all photocells 25 simultaneously and independently of the position of the chart 15.

If flip-flop XB remains in the set state further operation of the computing and/or printing cycle is prevented. A signal on line *fb* prevents the motion detector circuit G913 (FIG. 11 of the above-mentioned application) from responding to the cell checking lamp 55 illuminating photocells 25A and 25C. A time delay circuit 57 continues the inhibit for a time sufficient to allow the lamp 55 to cool.

Figure 5:
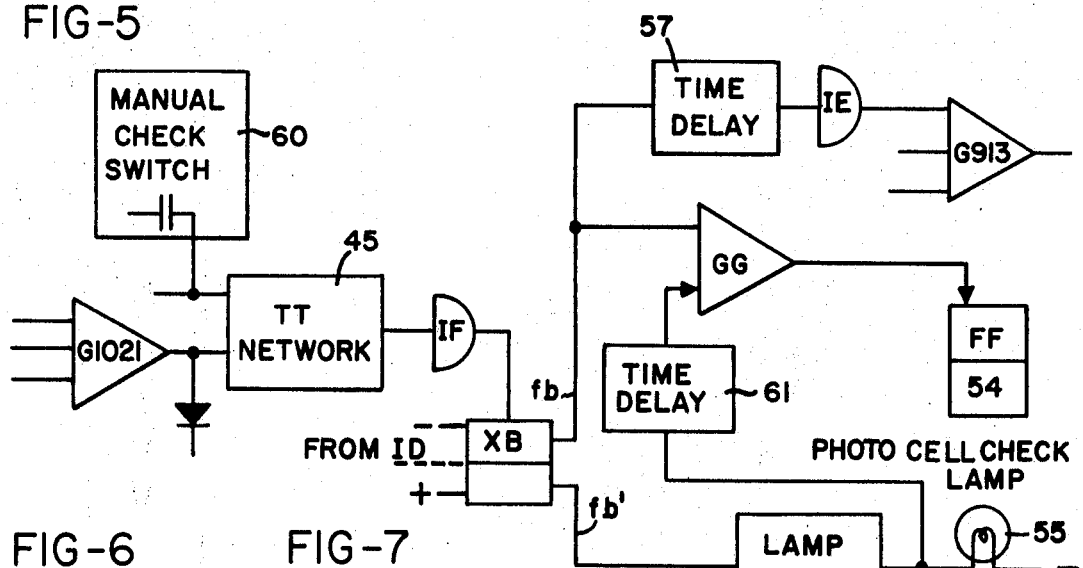
FIG. 5 is an electric schematic diagram showing another modification of the checking circuit of FIG. 4 where the transducer checking sequence is initiated whenever the weight on the scale platform is below a predetermined value.

In FIG. 5, photocell checking is initiated whenever the inputs to gate G1021 cause that gate to supply an output to the trailing trigger network 45. Also, a manual checking switch 60 may be provided to initiate the photocell check. In this embodiment, gate G1021 provides an output whenever the optical chart indicates a weight of less than ten one-hundreds of a pound. Thus, when the scale is unloaded and the platform returns toward the zero position, a photocell check is initiated. In this embodiment also, a time delay circuit 57 having a delay sufficient to allow photocell checking without triggering the motion detector is included between flip-flop XB and gate G913. Also, a second time delay circuit 61 is provided between the output of the lamp driver and flip-flop FF54 (FIG. 12 of the above-mentioned application).

Time delay circuit 61 provides sufficient elapsed time after the photocell check lamp 55 is illuminated for the photocells to be properly checked before the output of XB is sensed through gate GG to set FF54 if the photocell checking circuit indicates a failure. In the copending application, whenever FF54 is set, the printer cycle is prevented from operating and an error light is indicated.

In FIG. 6, the photocell checking cycle can also be initiated by an output from gate G66 (FIG. 8 of the above-mentioned application) which indicates that the computing cycle of the scale has been completed. Gate G66 could thus replace gate G1021 in FIG. 5, and therefore an output from the gate would be applied to the trailing trigger circuit 45 to indicate the photoelectric transducer testing sequence. In this embodiment, the photocells would be checked for proper operation once during each scale cycle.

FIG. 7 shows another embodiment including a counter 68 which is used to initiate the photocell checking sequence. The counter 68 may be connected to count the weighing operations and produce an output after a predetermined number of such operations had been performed. If desired, the counter could also produce an output on a random basis. The counter 68 would replace the gate G1021 in FIG. 5 to initiate the photocell checking sequence.

While the photocell checking sequence has been described above as being initiated at several possible times including the initial turn on of the scale, when a change is made in the commodity printing key, when the scale reads below a predetermined weight, once during or after each operating cycle, or periodically, as determined by a counter, it will be understood by those skilled in the art that there are other times when the photocell checking sequence could be initiated, such as any time a change is made in the tare or price per unit weight.

While the forms of apparatus herein described constitute preferred embodiments of the invention, it is to be understood that the invention is not limited to these precise forms of apparatus, and that changes may be made therein without departing from the scope of the invention

We claim:

1. In a weighing scale including optical means for converting the weight of a commodity into electrical signals, said means including:
   a light source;
   an optical chart having marks thereon representing the weight of the commodity;
   a plurality of photoelectric transducers positioned to receive light projected by said light source from said optical chart as modified by said marks;
   the improvement comprising:
   means for illuminating all said photoelectric transducers in accordance with a predetermined pattern;
   circuit means for checking each said photoelectric transducer individually for an electrical output indicating that said photoelectric transducer responds to illumination; and output means connected to said circuit means for providing an output when any of said photoelectric transducers fails to respond properly to exposure to light.

2. The scale of claim 1 wherein said means for illuminating all said photoelectric transducers includes a transparent portion at a predetermined location on said optical chart through which light from said light source is projected simultaneously onto all said photoelectric transducers.

3. The scale of claim 1 wherein means for illuminating all said photoelectric transducers includes a second light source positioned to illuminate all of said photoelectric transducers simultaneously regardless of the position of said optical chart.

4. The scale of claim 1 wherein said circuit means includes a flip-flop which is placed in a first condition during the checking of said photoelectric transducers and which is placed in a second condition only if all of said photoelectric transducers respond properly to exposure to said illumination at the completion of said predetermined pattern.

5. The scale of claim 4 further including means for computing the price of the commodity and for indicating or printing the weight, price per unit weight, and/or total price, said scale further including means responding to said flip-flop to prevent completion of said scale operation if any one of said photoelectric transducers fails.

6. In a computing weighing scale including readout means for converting the weight of a commodity into electrical signals, means responsive to the output of said readout means for computing the total price of the commodity, and means for indicating the output from said computing means, said readout means including:
a scale platform adapted to receive the commodity;
a light source;
an optical chart connected to and movable in response to the weight of the commodity on said platform, said chart having marks thereon representing the weight of the commodity; and
a plurality of photoelectric transducers positioned to receive light projected by said light source from said optical chart as modified by said marks;
the improvement comprising:
means for testing said photoelectric transducers for proper operation, said means including;
means for illuminating all of said photoelectric transducers in accordance with a predetermined pattern;
circuit means for checking each said photoelectric transducer individually for an electrical output indicating that said photoelectric transducer responds to illumination; and
output means connected to said circuit means for providing an output when any one of said photoelectric transducers fails to respond properly to said illumination.

7. The scale of claim 6 wherein said means for illuminating all of said photoelectric transducers includes a second light source positioned to illuminate all of said photoelectric transducers simultaneously regardless of the position of said optical chart.

8. The scale of claim 6 wherein said means for illuminating all said photoelectric transducers includes a transparent portion at a predetermined location on said optical chart through which light from said light source is projected simultaneously onto all said photoelectric transducers.

9. The scale of claim 6 further including means responsive to said output means for preventing an output from said computing means from being applied to said indicating means if any one of said photoelectric transducers fails to respond properly to illumination.

10. The scale of claim 6 further including:
means for counting the number of weighing operations performed by said scale and for producing an output after a predetermined number of said operations; and
means responsive to said counting means for initiating the testing of said photoelectric transducers.

11. The scale of claim 6 further including:
means for indicating the commodity being weighed; and
means responsive to a change in said commodity indicating means for initiating the testing of said photoelectric transducers.

12. The scale of claim 6 further including manual switch means for initiating the testing of said photoelectric transducers.

13. The scale of claim 6 further including circuit means for initiating the testing of said photoelectric transducers each time power is applied to said scale.

14. The scale of claim 6 including:
sensing means for providing an output at the end of the computing cycle; and
means responsive to said sensing means for initiating the testing of said photoelectric transducers.

15. The scale of claim 14 further including means for preventing said indicating means from indicating the output of said computing means if any one of said photoelectric transducers fails to respond properly to illumination.